(12) United States Patent
Babazadeh (10) Patent No.: US 9,882,476 B2
(45) Date of Patent: Jan. 30, 2018

(54) METHOD AND APPARATUS FOR PHASE CURRENT ESTIMATION IN SEMI-RESONANT VOLTAGE CONVERTERS

(71) Applicant: Infineon Technologies Austria AG, Villach (AT)

(72) Inventor: Amir Babazadeh, Laguna Hills, CA (US)

(73) Assignee: Infineon Tehnologies Austria AG, Villach (AT)

( * ) Notice: Subject to any disclaimer, the term of this patent is extended or adjusted under 35 U.S.C. 154(b) by 51 days.

(21) Appl. No.: 15/168,439

(22) Filed: May 31, 2016

(65) Prior Publication Data

US 2017/0346397 A1 Nov. 30, 2017

(51) Int. Cl.
*G05F 1/00* (2006.01)
*H02M 3/157* (2006.01)
*H02M 3/158* (2006.01)
*H02M 3/156* (2006.01)
*H02M 3/335* (2006.01)
(Continued)

(52) U.S. Cl.
CPC ........... *H02M 3/157* (2013.01); *H02M 3/156* (2013.01); *H02M 3/1584* (2013.01); *H02M 1/088* (2013.01); *H02M 3/33515* (2013.01); *H02M 2001/0009* (2013.01)

(58) Field of Classification Search
CPC ............... H02M 3/158; H02M 3/1588; H02M 2001/0067; H02M 3/1584; H02M 2003/1586; H02M 3/156; H02M 2003/1566; H02M 3/155; H02M 3/157; H02M 3/1563; H02M 2001/0009; H02M 1/083; H02M 3/33507; H04B 2215/069

USPC .... 323/271–272, 282–287; 363/21.02, 21.03
See application file for complete search history.

(56) References Cited

U.S. PATENT DOCUMENTS

2012/0249102 A1* 10/2012 Cuk ...................... H02M 3/158
                                                            323/282
2014/0091718 A1*  4/2014 Brinlee .............. H05B 33/0815
                                                            315/185 R
(Continued)

OTHER PUBLICATIONS

Hwu, K. I. et al., "Ultrahigh Step-Down Converter", IEEE Transactions on Power Electronics, vol. 30, No. 6, Jun. 2015, pp. 3262-3274.

*Primary Examiner* — Nguyen Tran
(74) *Attorney, Agent, or Firm* — Murphy, Bilak & Homiller, PLLC (57) ABSTRACT

A resonant or semi-resonant voltage converter includes a synchronous rectification (SR) switch through which a current having a half-cycle sinusoidal-like shape is conducted when the SR switch is active. The current through the SR switch is modelled, and estimates of the SR switch current are generated by a digital estimator based on the model. The SR switch current estimates are updated at a fairly fast rate, as may be needed by a controller of the voltage converter. Analog converters are run at a slower rate, and generate error signals that are fed back into the digital estimator in order to improve future SR switch current estimates. Because the analog converters run at a fairly slow rate, power usage is minimal. However, the SR switch current estimates are updated at a rate that is fast enough to provide adequate control for the voltage converter.

21 Claims, 8 Drawing Sheets (51) Int. Cl.
 *H02M 1/088* (2006.01)
 *H02M 1/00* (2006.01)

(56) References Cited

U.S. PATENT DOCUMENTS

2015/0115911 A1* 4/2015 Parto .................... H02M 3/158
 323/271
2015/0236595 A1 8/2015 Babazadeh et al.

* cited by examiner

METHOD AND APPARATUS FOR PHASE CURRENT ESTIMATION IN SEMI-RESONANT VOLTAGE CONVERTERS

TECHNICAL FIELD

The present application relates to semi-resonant and resonant voltage converters and, in particular, relates to techniques for estimating the current flowing through each phase of such converters.

BACKGROUND

Resonant and semi-resonant DC-DC voltage converters, including isolated and non-isolated topologies, are used in a variety of applications including telecommunications, consumer electronics, computer power supplies, etc. The usage of such converters is gaining popularity because of their zero-voltage and/or zero-current switching characteristics, and their ability to utilize parasitic electrical properties inherent in an electronic circuit. Such converters provide advantages including lower cost and higher efficiency as compared to other types of converters.

The output current of many resonant and semi-resonant voltage converters takes the shape of the upper half cycle of a sinusoid, wherein this shape occurs during each switching cycle of such voltage converters. These converters are often controlled using a variable switching frequency in order to meet their associated load requirements, which may vary over time. Multiple phases of such converters may be connected in parallel in order to increase the available load current and in order to reduce ripple at the output of such converters.

A high-performance voltage converter needs current information for each of its phases in order to provide high-quality power to its load. Such phase current information is critical in providing key features such as phase fault detection, peak current protection, phase balancing, accurate load line estimation, power saving modes, over-current protection, and improved transient response. Conventional switching power converters, including resonant converters, include current sensing/sampling networks for obtaining phase current information. However, conventional current sampling networks consume significant power and require a relatively large die area.

For example, one conventional approach for sampling phase current information makes use of flash analog-to-digital converters (ADCs). While such ADCs provide can provide fast conversion and high precision, they are relatively expensive, have high leakage current even when they are not actively converting, use high power while they are converting, and require significant die area on a controller chip or elsewhere within a voltage converter. Another conventional approach for obtaining phase current information makes use of tracking ADCs. However, tracking ADCs are susceptible to noise, require relatively high power, consume significant die area, and have poor tracking capability and performance at high currents.

Accordingly, there is a need for improved phase current estimation techniques that may be used by resonant or semi-resonant voltage converters, wherein the estimation techniques consume low power and die area, while providing accurate and fast phase current tracking.

SUMMARY

According to an embodiment of a switching voltage converter, the converter makes use of a variable switching frequency and includes a first phase, a control circuit, and a current estimator. The first phase comprises a synchronous rectification (SR) switch through which an SR current having a half-cycle sinusoidal-like shape is conducted when the SR switch is active. The current estimator includes both a digital estimation circuit and an analog conversion circuit. The digital estimation circuit generates a first estimate of the SR current using a model of current through the SR switch and an error signal. The digital estimation circuit runs at a first frequency, and updates its first estimate of SR current at the first frequency. The analog conversion circuit generates the error signal based upon an actual measured SR current and the first estimate of SR current generated by the digital estimation circuit. The analog conversion circuit updates the error signal and provides conversions at a second frequency, which is generally lower than the first frequency which is used by the digital estimation circuit. The control circuit is operable to control cycle-by-cycle switching of the SR switch by providing a pulse width modulation (PWM) control signal to the SR switch, wherein the frequency and/or the duty cycle of the PWM control signal is based upon the first estimate of the SR current.

According to an embodiment of a method, a method for current estimation in a variable-frequency voltage converter is provided. The voltage converter includes a synchronous rectification (SR) switch through which an SR current having a half-cycle sinusoidal-like shape is conducted when the SR switch is active. The method would typically be implemented within the voltage converter, or a controller within it. For each switching cycle of the voltage converter, the SR switch is enabled such that it conducts the SR current for an SR conducting period, wherein the SR conducting period is a portion of a switching period for a current switching cycle. A modelled SR current is generated based upon a model of the SR current during the SR conducting period, and is updated at a first frequency. A first SR current estimate is generated using the modelled SR current and a digital error signal. The first SR current estimate is converted into an analog SR current estimate, wherein the analog SR current estimate is updated at a second frequency. An analog SR current error is generated by taking the difference between the analog SR current estimate and a measured SR current estimate. This analog SR current estimate is then converted into a digital error signal that is also updated at the second frequency. The first SR current estimates are thus updated at a first frequency, and the analog-to-digital and digital-to-analog conversions are performed at a second frequency, wherein the second frequency is typically much lower than the first frequency. The method is normally repeated for each switching cycle of the voltage converter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

The embodiments described herein provide techniques for estimating the current within a phase of a resonant or semi-resonant voltage converter that uses variable-frequency switching. The estimated current is updated fairly frequently, but the analog components that are used for estimating the current are run at a relatively low frequency. The techniques make use of a model for the current, and then use that model and the actual measured current to create an error signal. The error signal is fed back into the model in order to update and improve the estimated current. Because the analog components that provide the error signal are run at a fairly low frequency, the current consumption and die area of the analog components can be kept fairly low. However, these techniques provide accurate current tracking with fairly frequent current estimate updates, as are needed by the controller of a variable-frequency switching voltage converter.

Various embodiments of voltage converter circuits and methods within voltage converters will be provided in the following detailed description and the associated figures. The described embodiments provide particular examples for purposes of explanation, and are not meant to be limiting. Features and aspects from the example embodiments may be combined or re-arranged, except where the context does not allow this.

Figure 1:
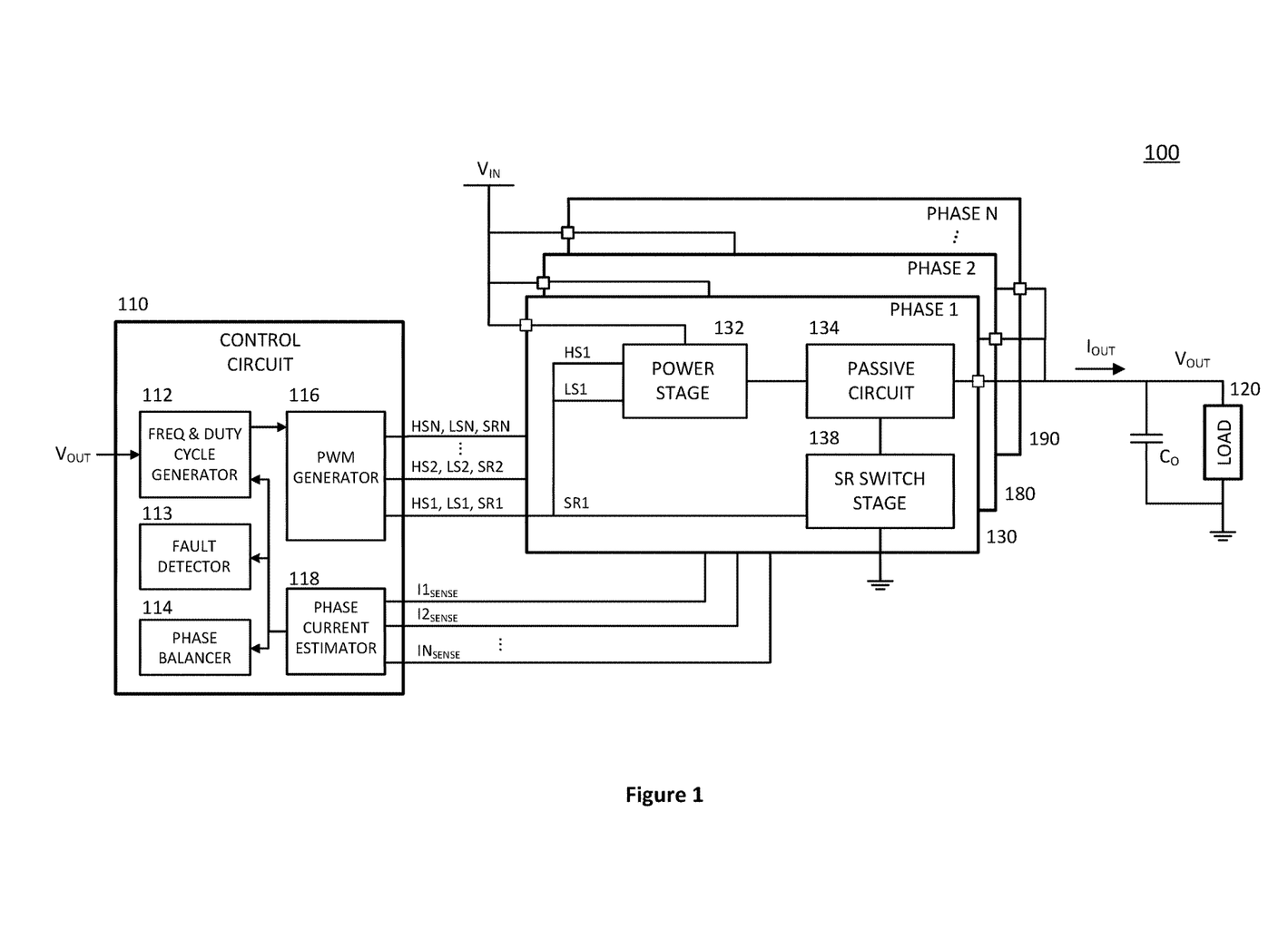
FIG. 1 illustrates a block diagram of an embodiment of a multi-phase voltage converter including a control circuit, wherein the control circuit includes a phase current estimator.

FIG. 1 illustrates an embodiment of a voltage converter 100 that is configured to input power from a power source $V_{IN}$, output power for driving a load 120, and that includes a phase current estimator 118. The voltage converter 100 supplies a current $I_{OUT}$ to the load 120 and to a capacitor $C_O$ that serves to filter an output voltage $V_{OUT}$. The voltage converter of FIG. 1 includes multiple phases 130, 180, 190. Phase 1 (130), which is taken as representative of the multiple phases, is illustrated in block diagram form with the understanding that the other phases would be similarly configured. While FIG. 1 illustrates a multi-phase voltage converter, most of the techniques presented herein are also applicable to a single-phase voltage converter.

As illustrated, phase 1 (130) includes a passive circuit 134 that couples a power stage 132 to the voltage converter output $V_{OUT}$. The power stage 132 inputs switch control signals HS1 and LS1 for controlling switches therein. The switches within the power stage 132 typically require drivers (not shown for ease of illustration). The passive circuit 134 is coupled to a synchronous rectification (SR) switch stage 138, which serves to switchably couple the passive circuit 134 to ground. The SR switch stage 138 includes an SR switch (not shown), which also typically requires a driver (also not shown).

A control circuit 110 controls the switches of the power stage 132 and the SR switch stage 138 for each of the phases 130, 180, 190 of the voltage converter 100. A frequency and duty cycle generator 112 determines a switching frequency and duty cycle for the voltage converter 100 based upon the load requirements as sensed from the output voltage $V_{OUT}$, and provides these parameters to a pulse-width modulation (PWM) generator 116. The PWM generator 116, in turn, generates switch control signals (e.g., HS1, LS1, SR1) for each of the phases of the voltage converter 100. The switching frequency of the voltage converter 100 is variable and changes as the load requirements change.

A phase current estimator 118 generates an estimate of current for each phase of the voltage converter 100. This estimate is based, in part, on a sensed (measured) current from each phase $I1_{SENSE}$, $I2_{SENSE}$, $IN_{SENSE}$. The phase current estimates generated by the phase current estimator 118 are provided to other circuits within the control circuit 110. Examples of circuits that may use the phase current estimates include a phase balancer 114 (for multi-phase voltage converters), a fault detector 113, and the frequency and duty cycle generator 112.

The control circuit 110 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The control circuit 110 may also include memory, e.g., non-volatile memory such as flash, that includes instructions or data for use by the processor circuitry. The control circuit 110 inputs several sensor signals (e.g., $V_{OUT}$, $I1_{SENSE}$, $I2_{SENSE}$, $IN_{SENSE}$) to estimate the power requirements for the load 120 and to otherwise aid in the generation of the switch control signals.

Techniques for determining the switching frequency and duty cycles based upon the load requirements of a voltage converter are, generally, well-known in the art. Likewise, techniques for fault detection and phase balancing are well-known. Such conventional techniques will not be further elaborated upon herein, in order to avoid obfuscating the unique aspects of the invention. Instead, the following description will focus on detailed techniques related to phase current estimation and, more particularly, phase current estimation within resonant and semi-resonant voltage converters. Before delving into these phase current estimation techniques, the voltage converter circuits to which they apply will first be described in order to better understand the waveforms of the phase currents that are being estimated.

Figure 2:
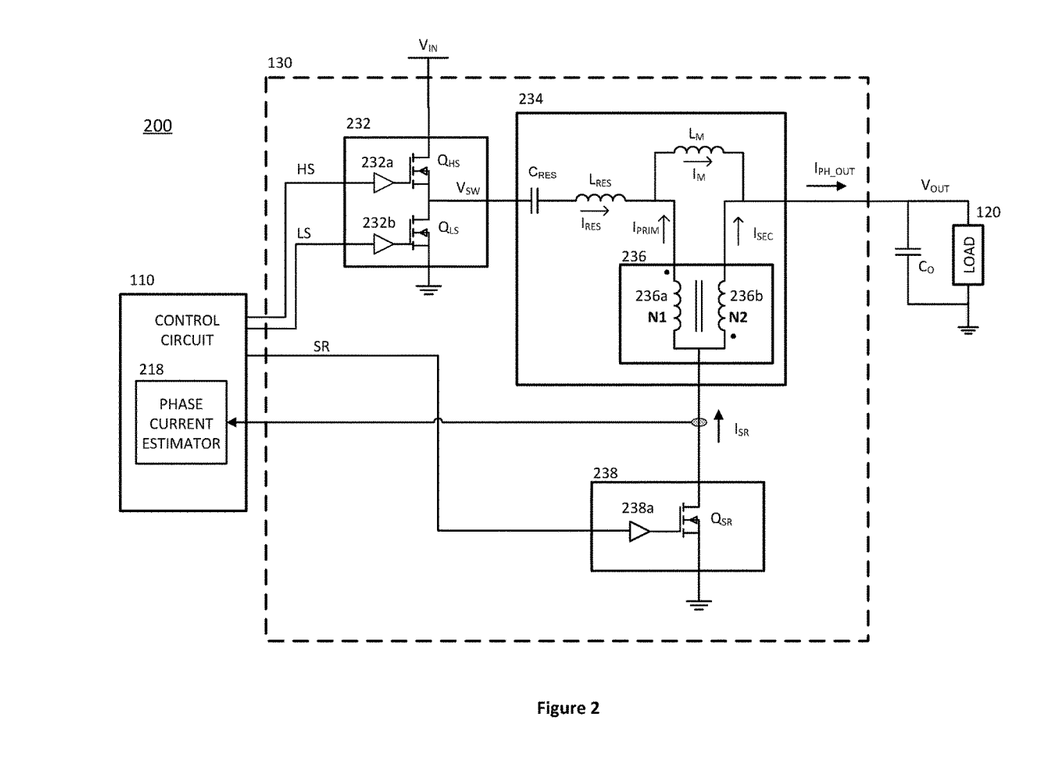
FIG. 2 illustrates a circuit diagram of an embodiment for one phase of a voltage converter such as that illustrated in FIG. 1, and may be considered itself as a single-phase voltage converter.

FIG. 2 illustrates a circuit diagram 200 which shows phase 1 (130) of the voltage converter 100 illustrated in FIG. 1 in greater detail. In order to simplify the following description, only the single-phase voltage converter 200, as shown in FIG. 2, will be described henceforth. It is to be understood that the phase current estimation techniques are readily extended to a multi-phase voltage converter, such as that illustrated in FIG. 1. In order to support a multi-phase voltage converter, the phase current estimator 218 may be replicated for each of the phases in order to create a multi-phase current estimator 118, or may otherwise be extended, e.g., via time-slicing, to support multiple phases.

An input voltage $V_{IN}$ is provided to a power stage 232 at a high-side switch $Q_{HS}$ is that is coupled to a low-side switch $Q_{LS}$ at a switching node $V_{SW}$. The low-side switch $Q_{LS}$ is, in turn, connected to ground. Each of these switches $Q_{HS}$, $Q_{LS}$ is controlled by a respective driver 232a, 232b as shown. The switching node $V_{SW}$ of the power stage 232 is coupled to a passive circuit 234, which provides an output current $I_{PH\_OUT}$ and voltage $V_{OUT}$ to a load 120. The passive circuit 234 includes a resonant tank comprised of a capacitor $C_{RES}$ and an inductor $L_{RES}$. The inductor $L_{RES}$ may merely be leakage inductance (e.g., the inherent parasitic inductance of the circuit wiring), or it may be an actual inductor component together with some leakage inductance.

The inductor $L_{RES}$ is coupled to a transformer/tapped inductor 236 having N1 primary-side windings 236a and N2 secondary-side windings 236b. The ratio N2/N1 determines the output/input voltage ratio of the transformer/tapped inductor 236 when it is conducting current. (Conversely, the ratio N1/N2 determines the output/input current ratio of the transformer/tapped inductor 236.) Because of the high peak current provided at the output of the transformer/tapped inductor 236 and in order to reduce the AC resistance, the transformer/tapped inductor 236 is often designed to have a single secondary-side winding 236b. Defining the total number of primary and secondary-side windings as n, the turns ratio is thus (n−1) to 1. Henceforth, the convention of n total windings and 1 secondary-side winding 236b will be used, but it should be understood that the equations and formulas that follow may instead be derived using N1 primary-side windings 236a and N2 secondary-side windings 236b.

For the illustrated circuit 130, a magnetizing inductor $L_M$ is connected across the transformer/tapped inductor 236. An SR switch stage 238 is connected to the transformer/tapped inductor 236 and serves to couple its center tap to ground when the SR switch stage 238 is conducting. The SR switch stage 238 includes an SR switch $Q_{SR}$, and, typically, a driver 238a which is coupled to a control terminal (e.g., a gate) of the SR switch $Q_{SR}$.

The high-side, low-side, and SR switches $Q_{HS}$, $Q_{LS}$, $Q_{SR}$ are shown in FIG. 2 as enhancement-mode metal-oxide semiconductor field-effect transistors (MOSFETs), but other switch devices may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches of the power stage 232 and of the SR switch stage 238 (e.g., $Q_{HS}$, $Q_{LS}$, $Q_{SR}$) may be integrated on the same semiconductor die, may each be provided on separate dies, or may otherwise be spread across a plurality of semiconductor dies. The drivers for the switches may be integrated on the same semiconductor die(s) as their corresponding switches, or may be provided on separate dies.

The control circuit 110 generates PWM signals HS, LS, and SR which are coupled to the drivers 232a, 232b, 238a that control the switches $Q_{HS}$, $Q_{LS}$, $Q_{SR}$. The control circuit 110 determines the frequency and duty cycles of the PWM signals HS, LS, SR so as to meet the power requirements of the load 120. In a semi-resonant voltage converter, such as that illustrated in FIG. 2, the high-side and low-side switches $Q_{HS}$, $Q_{LS}$ of the power stage 232 are controlled such that these switches $Q_{HS}$, $Q_{LS}$ do not conduct at the same time. A typical switching cycle of the voltage converter 200 begins with a "dead time" during which none of the switches $Q_{HS}$, $Q_{LS}$ $Q_{SR}$ are conducting. This is followed by a "$T_{ON}$" period during which the high-side switch $Q_{HS}$ is conducting, but the low-side switch $Q_{LS}$ and the SR switch $Q_{SR}$ are not conducting. A "$T_{OFF}$" period follows this, during which the high-side switch $Q_{HS}$ is not conducting, but the low-side switch $Q_{LS}$ and the SR switch $Q_{SR}$ are conducting. Note that the terms "$T_{ON}$" and "$T_{OFF}$," as conventionally used in the context of resonant converters, refer, respectively, to the conducting and non-conducting periods of a high-side switch such as $Q_{HS}$. Hereinafter, the term "$T_{SR\_ON}$" will often be used instead of "$T_{OFF}$," as $T_{SR\_ON}$ more clearly describes this period in the context of the current estimation techniques described below.

The phase current estimator 218 is illustrated as being a part of the control circuit 110, but it should be understood that, in some embodiments, the phase current estimator 218 may be implemented separately from the control circuit 110. The phase current estimator 218 is provided with a measured current from the phase circuit 130. As illustrated in FIG. 2, the current $I_{SR}$ through the SR switch $Q_{SR}$ is measured (sensed). Other phase currents, such as $I_{PH\_OUT}$, could instead be measured (sensed), but the following explanation presumes that the current $I_{SR}$ is measured, and that the phase current estimator 218 is estimating the current $I_{SR}$ through the SR switch $Q_{SR}$.

Figure 3:
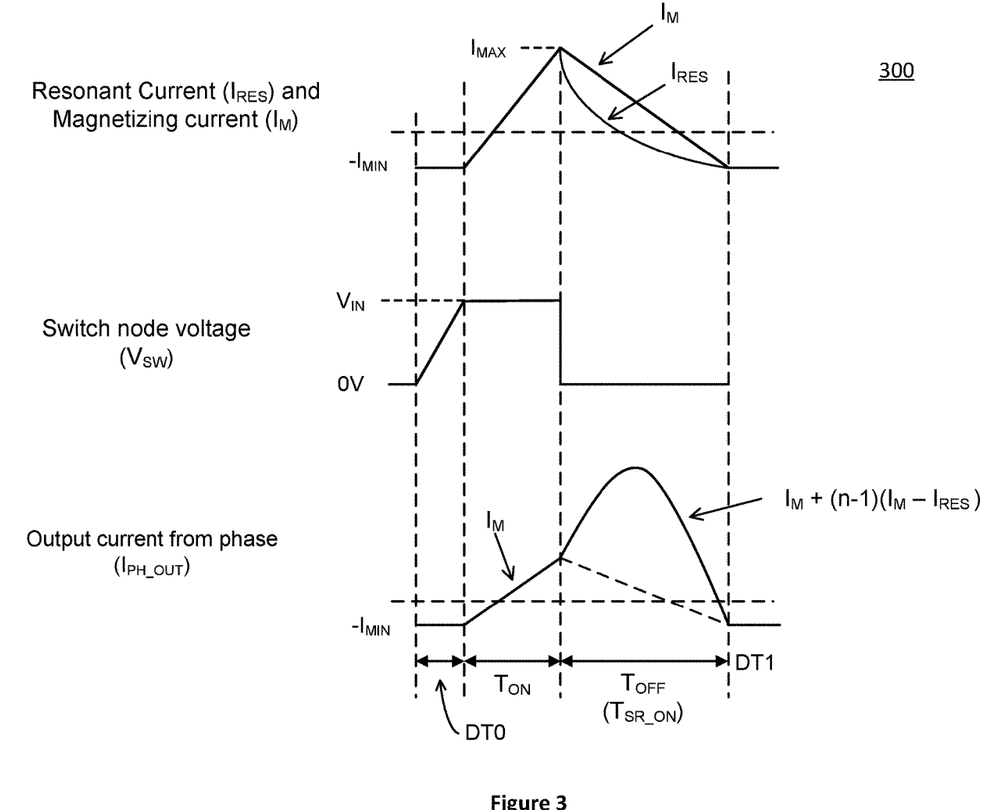
FIG. 3 illustrates voltage and current waveforms as might be generated in one phase of a semi-resonant voltage converter such as that shown in FIG. 2.

FIG. 3 illustrates waveforms 300 for the output current $I_{PH\_OUT}$ from the phase circuit 130, the voltage at the switch node $V_{SW}$, and the resonant and magnetizing currents $I_{RES}$, $I_M$ of the voltage converter 200 during a switch cycle. At the start of a dead time period DT0, the phase output current $I_{PH\_OUT}$ and the magnetizing current $I_M$ are at a minimum value $-I_{MIN}$. None of the power switches $Q_{HS}$, $Q_{LS}$, $Q_{SR}$ are conducting during the dead time DT0, i.e., the control circuit 110 generates PWM signals HS=0, LS=0, SR=0. The current $-I_{MIN}$ charges the output capacitance of the low-side switch $Q_{LS}$ and causes the switch node voltage $V_{SW}$ to rise to a level near $V_{IN}$ during the dead time DT0. At the end of the dead time DT0, the high-side power switch $Q_{HS}$ is turned on, whereas the low-side switch $Q_{LS}$ and the SR switch $Q_{SR}$ remain off, e.g., by setting HS=1, LS=0, and SR=0 at the end of DT0. This state is maintained for an interval of time denoted "$T_{ON}$." During $T_{ON}$, the switch node voltage $V_{SW}$ is tied to $V_{IN}$ through the high-side power switch $Q_{HS}$, and the phase output current $I_{PH\_OUT}$ and the magnetizing current $I_M$ of the voltage converter phase 130 rise in a linear manner until the magnetizing current $I_M$ reaches a maximum value $I_{MAX}$. The magnetizing current $I_M$ associated with the LC tank formed by the resonance capacitor $C_{RES}$, the inductor $L_{RES}$ and the magnetizing inductor $L_M$ accounts for the rise in the phase output current $I_{PH\_OUT}$ during $T_{ON}$. (With the SR switch $Q_{SR}$ disabled, substantially no current flows through the primary-side windings 236a and the secondary-side winding(s) 236b of the transformer/tapped inductor 236 meaning that magnetizing current $I_M \approx I_{RES}$.)

During the next interval of the switching cycle, denoted as "$T_{OFF}$" or "$T_{SR\_ON}$," the high-side switch $Q_{HS}$ is turned off, while the low-side switch $Q_{LS}$ and the SR switch $Q_{SR}$ are turned on, e.g., by setting HS=0, LS=1, and SR=1. The switch node voltage $V_{SW}$ drops to and remains at zero during the $T_{OFF}$ ($T_{SR\_ON}$) interval, because the switch node $V_{SW}$ is coupled to ground though the low-side switch $Q_{LS}$. Also during the $T_{OFF}$ ($T_{SR\_ON}$) interval, a resonance is formed between the resonance capacitor $C_{RES}$ and inductor $L_{RES}$, and results in a resonant current $I_{RES}$. A portion of this current, i.e., $I_{PRIM}=I_M-I_{RES}$, flows through into the primary-side winding 236a of the transformer/tapped inductor 236, and leads to a current $I_{SEC}=(N1/N2)*(I_M-I_{RES})=(n-1)*(I_M-$ $I_{RES}$) flowing through the secondary-side winding 236b of the transformer/tapped inductor 236. The output current $I_{PH\_OUT}$ of the phase 130 is, thus, the current $I_M$ flowing through the magnetizing inductor $L_M$ plus the current $I_{SEC}$ flowing through the secondary-side winding 236b, i.e., $I_{PH\_OUT}=I_M+(n-1)*(I_M-I_{RES})$. As illustrated in FIG. 3, this current $I_{PH\_OUT}$ initially rises during $T_{OFF}$ ($T_{SR\_ON}$), subsequently falls, and takes on the shape of the upper half cycle of a sinusoid.

The currents described above may be well-approximated using piecewise first and second order polynomials. In some embodiments, more accurate approximations may be made with higher-order polynomials, but at the expense of increased complexity, which requires more die area and higher power consumption for the phase current estimator 218. Because the additional accuracy is relatively insignificant, such higher-order polynomial approximations are not preferred, and the following examples are described using polynomials of order two or less.

As illustrated in FIG. 3, the magnetizing current $I_M$ may be approximated using:

$$I_M \approx \begin{cases} -I_{MIN} & \text{during } DT0 \\ m_1 t - I_{MIN} & \text{during } T_{ON} \\ -m_2 t + I_{MAX} & \text{during } T_{OFF} \end{cases} \quad (1)$$

The resonant current $I_{RES}$ is the same as the magnetizing current $I_M$ while the SR switch $Q_{SR}$ is not conducting (i.e., during DT0 and $T_{ON}$), but, as illustrated in FIG. 3, has a different value during $T_{OFF}$ ($T_{SR\_ON}$), as approximated with:

$$I_{RES} \approx \begin{cases} -I_{MIN} & \text{during } DT0 \\ m_1 t - I_{MIN} & \text{during } T_{ON} \\ \alpha t^2 + \beta t + I_{MAX} & \text{during } T_{OFF} \end{cases} \quad (2)$$

As explained above, the output phase current may then be given by:

$$I_{PH\_OUT} = \begin{cases} I_M = -I_{MIN} & \text{during } DT0 \\ I_M & \text{during } T_{ON} \\ I_M + (n-1)(I_M - I_{RES}) & \text{during } T_{OFF} \end{cases} \quad (3)$$

No current flows through the SR switch $Q_{SR}$ while it is disabled, i.e., during DT0 and $T_{ON}$. The current $I_{SR}$ through the SR switch $Q_{SR}$ when it is enabled, i.e., during $T_{OFF}$ ($T_{SR\_ON}$) is given by:

$$I_{SR} = n(I_M - I_{RES}) \approx \begin{cases} 0 & \text{during } DT0 \\ 0 & \text{during } T_{ON} \\ n(-m_2 t - \alpha t^2 - \beta t) & \text{during } T_{OFF}(T_{SR\_ON}) \end{cases} \quad (4)$$

Figure 4:
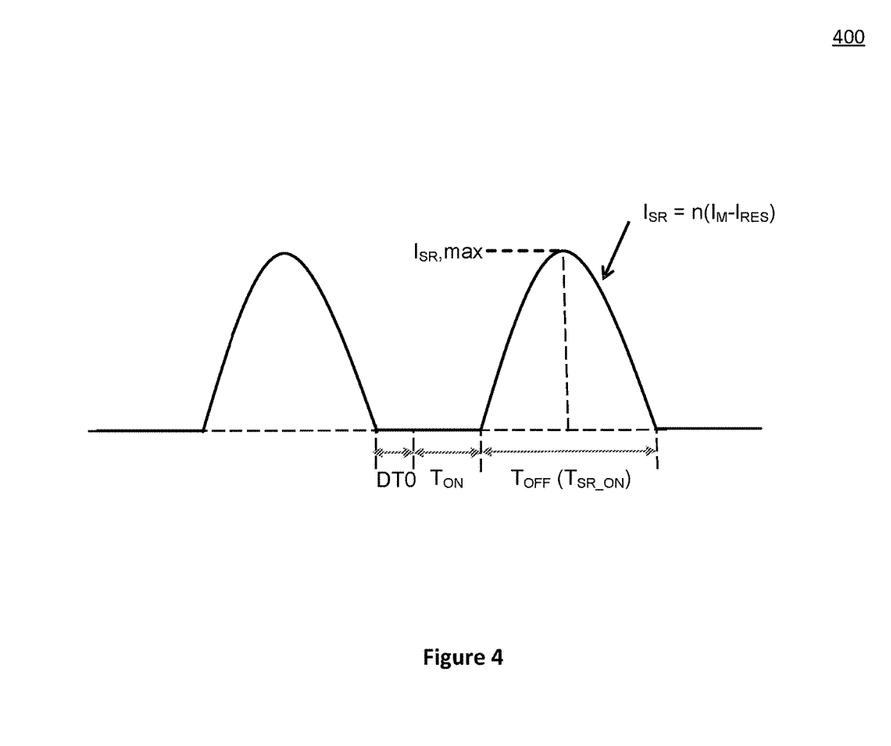
FIG. 4 illustrates a waveform corresponding to the current flowing through a synchronous rectification (SR) switch within a semi-resonant voltage converter such as the SR switch shown in FIG. 2.

FIG. 4 illustrates a waveform 400 corresponding to the SR switch current $I_{SR}$. Note that this waveform takes on the shape of the upper half cycle of a sinusoid, and that it may be well approximated by a second-order polynomial such as that given in equation (4).

A current $I_{RES}$ flows (oscillates) through the resonant inductor $L_{RES}$ due to the switching of the high and low-side power switches $Q_{HS}$, $Q_{LS}$, buts the average current $<I_{RES}>$ is zero. The average output current $<I_{PH\_OUT}>$ for the phase, also denoted as $I_O$, is, thus, the same as the average current $<I_{SR}>$ through the SR switch $Q_{SR}$. During steady-state operation, this leads to the following equations for the average currents in the voltage converter 200:

$$<I_{RES}>=0 \quad (5)$$

$$I_O=<I_{PH\_OUT}>=<I_{SR}>=<n(I_M-I_{RES})>=<nI_m> \quad (6)$$

$$\langle I_M \rangle = \frac{I_O}{n} \quad (7)$$

Setting the average magnetizing current $<I_M>$ over an entire cycle period (i.e., DT0, $T_{ON}$, and $T_{OFF}$) to $$\frac{I_O}{n}$$

in equation (1) and solving for $I_{MIN}$ yields:

$$I_{MIN} = -\left(\frac{I_O}{n}\right) + \frac{m_1 T_{ON}}{2} \quad (8)$$

Substituting the approximation for $I_{MIN}$ given by equation (8) into the approximations for $I_{RES}$ given by equation (2) yields the following approximations for the coefficients α and β:

$$\beta = -\alpha T_{OFF} - m_2 \quad (9)$$

$$\alpha = \frac{6 I_O T_{SW}}{n T_{OFF}^3} \quad (10)$$

Substituting the approximation for β given in equation (9) into the equation for the SR switch current $I_{SR}$ given in equation (4) yields the following simplified approximation for $I_{SR}$:

$$I_{SR} \approx n\alpha(T_{OFF}-t)t \text{ during } T_{OFF}(T_{SR\_ON}) \quad (12)$$

The maximum SR switch current $I_{SR}$,max occurs at the mid-point of each $T_{OFF}$ ($T_{SR\_ON}$) period, i.e., at $t=(T_{SR\_ON}/2)$ from the beginning of such a period. This can be seen by taking the derivative with respect to time of the current $I_{SR}$, as given in equation (12), setting this derivative $$\frac{d(I_{SR})}{dt}$$

to zero, and solving for time t. This is also readily apparent from the waveform 400 of the current $I_{SR}$ as illustrated in FIG. 4. At time $t=(T_{SR\_ON}/2)$, the SR switch current is given by:

$$I_{SR}, \max = n\alpha \left( \frac{T_{SR\_ON}^2}{4} \right) \quad (13)$$

$$I_{SR}, \max = n\left(\frac{6I_O T_{SW}}{nT_{SR\_ON}^3}\right)\left(\frac{T_{SR\_ON}^2}{4}\right) \quad (14)$$

$$I_{SR}, \max = \left(\frac{1.5 I_O T_{SW}}{T_{SR\_ON}}\right) \quad (15)$$

Using equation (13), note that a may be solved as a function of the maximum SR switch current:

$$\alpha = \left(\frac{4 I_{SR}, \max}{nT_{SR\_ON}^2}\right) \quad (16)$$

The above equations provide several approximations that may be used when modelling the SR switch current $I_{SR}$ using a $2^{nd}$ order polynomial. Attention is now turned to describing a detailed implementation of the phase current estimator 218 based upon the models and approximations given in equations (1) to (16).

Figure 5:
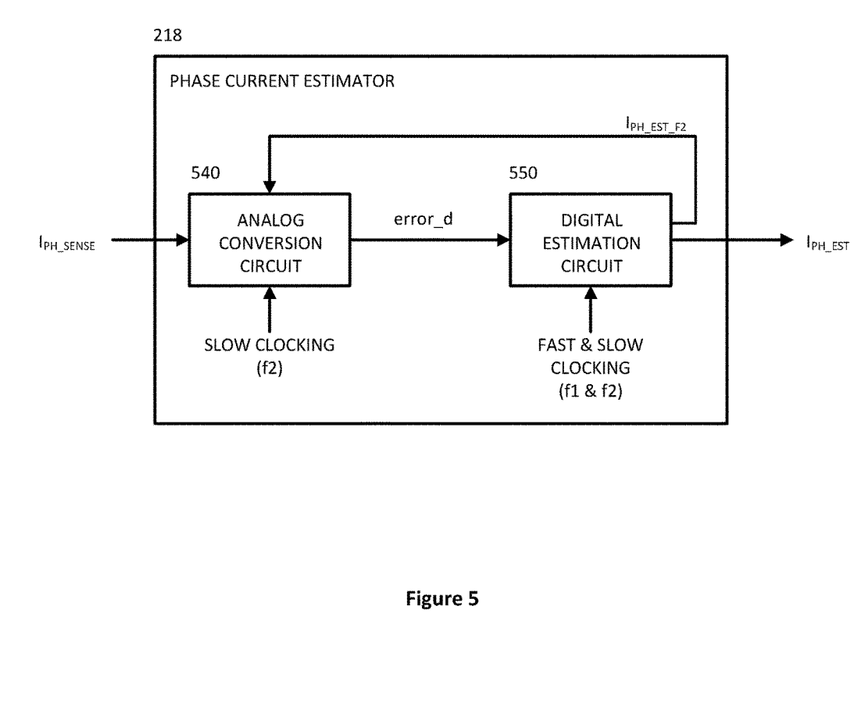
FIG. 5 illustrates an embodiment of a phase current estimator, such as that illustrated in FIG. 1.

FIG. 5 illustrates, at a high-level, an embodiment of the phase current estimator 218 of FIG. 2. This estimator 218 is partitioned into an analog conversion circuit 540 and a digital estimation circuit 550. The analog conversion circuit 540 includes an analog-to-digital converter (ADC) and a digital-to-analog converter (DAC). (For ease of illustration, the ADC and DAC are not shown in FIG. 5.) While these components generally require high power, the ADC and DAC of the analog conversion circuit 540 consume relatively low power because they are running at a slow clock frequency f2. The digital estimation circuit 550 uses a higher clocking frequency f1, but it also consumes relatively low power because it only contains digital circuitry. The digital estimation circuit generates an estimate of the phase current $I_{PH\_EST}$ which is updated at the higher clocking frequency f1. The estimated phase current $I_{PH\_EST}$ is provided to external circuits, such as circuits within the control circuit 110 of the voltage converter 100 illustrated in FIG. 1, whereas a downsampled version of this current, denoted $I_{PH\_EST\_F2}$, is fed back to the analog conversion circuit 540.

The analog conversion circuit 540 is provided with a measured (sensed) phase current $I_{PH\_SENSE}$, which it combines with the downsampled current estimate $I_{PH\_EST\_F2}$ to arrive at a digital error signal error_d. The digital error signal error_d is updated at the slower clock frequency f2, and is provided to the digital estimation circuit 550 so that it may update (improve) its phase current estimation $I_{PH\_EST}$.

As previously mentioned, the phase current $I_{PH\_SENSE}$ could be measured (and estimated) based on several different currents within a phase of a voltage converter, but the phase current must correspond to the output current, such as $I_{PH\_OUT}$ shown in FIG. 2, for most uses that are required by the control circuit 110 of the voltage converter 100. The output phase current $I_{PH\_OUT}$, as illustrated in FIG. 2, could be directly measured and estimated by the phase current estimator 218. However, this is not preferred as the approximations for this current $I_{PH\_OUT}$, e.g., as given in equation (3), are somewhat complicated due to the three (3) piecewise waveforms that must be approximated. Instead, and as described in the following embodiment, measuring and estimating the current $I_{SR}$ through the SR switch $Q_{SR}$ is preferred, as the only (non-zero) waveforms that must be approximated are during the $T_{OFF}$ ($T_{SR\_ON}$) time period. This current $I_{SR}$ provides the necessary input required for controlling a voltage converter such as the voltage converter 200 of FIG. 2, and this current $I_{SR}$ may be estimated reasonably efficiently using approximations such as those given by equation (4).

The current $I_{SR}$ may be measured by using the effective on-state resistance ($R_{dson}$) of the SR switch $Q_{SR}$ and the voltage across the SR switch $Q_{SR}$, or by using a current mirror. The current measurement, for $I_{SR}$ or otherwise, may also be accomplished by using other standard means such as measuring the voltage across a sensing resistor, or by using direct current sensing (DCR) techniques.

Figure 6:
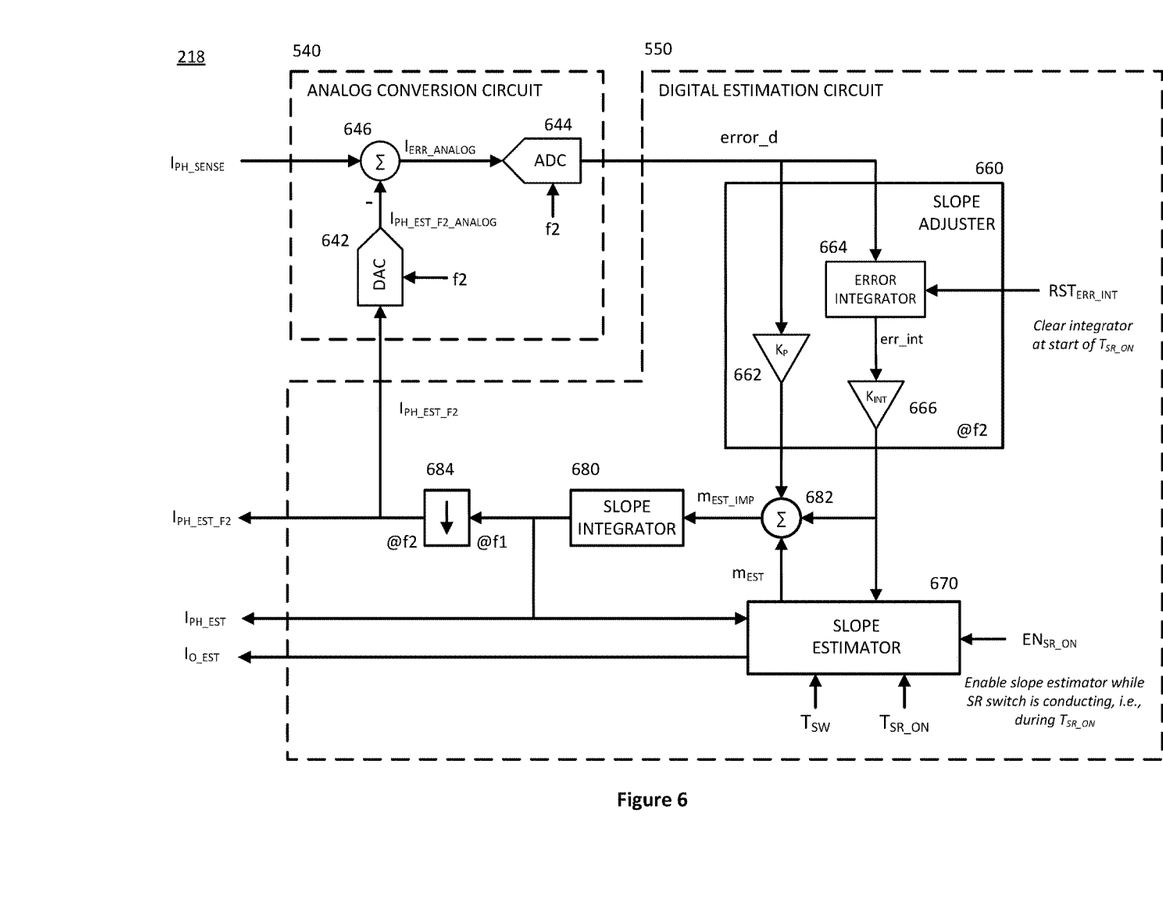
FIG. 6 illustrates an embodiment of a phase current estimator, such as that of FIG. 5, but with additional detail.

FIG. 6 illustrates an embodiment of the phase current estimator 218 in greater detail. As in FIG. 5, the phase current estimator 218 is partitioned into an analog conversion circuit 540 and a digital conversion circuit 550. The digital conversion circuit 550 is principally comprised of a slope estimator 670, a slope adjuster 660, and a slope integrator 680.

The slope estimator 670 generates estimates $m_{EST}$ of the slope for the phase current $I_{SR}$. These slope estimates $m_{EST}$ are updated at a rate of f1. The slope estimator 670 only provides slope estimates $m_{EST}$ while current $I_{SR}$ is flowing through the SR switch $Q_{SR}$. This is indicated in FIG. 6 by an enable signal $EN_{SR\_ON}$, which may correspond, e.g., to the PWM signal "SR" of the voltage converter 200 in FIG. 2. In addition to the slope estimates $m_{EST}$, the slope estimator 670 may also provide a relatively infrequent estimate, denoted by $I_{O\_EST}$, of the current $I_{SR}$, that is only updated once per switch cycle ($T_{SW}$) of the voltage converter 200. As also shown in FIG. 6, the slope estimator 670 inputs an integrated error signal $K_{INT}$*(err_int), which may be used to update and improve the slope estimate $m_{EST}$ as well as the switch cycle period $T_{SW}$ and the SR conducting period $T_{SR\_ON}$, which are also used in the generation of the slope estimate $m_{EST}$. Further details regarding the slope estimator 670 are provided below in conjunction with the description of FIG. 7.

The slope estimate $m_{EST}$ is modified by a digital summing circuit 682 to yield an improved slope estimate $m_{EST\_IMP}$, which is input to a slope integrator 680. The slope integrator 680 integrates the improved slope estimate $m_{EST\_IMP}$ to generate the phase current estimate $I_{PH\_OUT}$. The slope integrator 680 operates on digital samples $m_{EST\_IMP}$, which are provided/updated at a rate given by the frequency f1. A discrete/digital integration, as performed by the slope integrator 680, is the same as an accumulation of the samples $m_{EST\_IMP}$ over time. Because the input samples $m_{EST\_IMP}$ to the slope integrator 680 are updated at the frequency f1, the output current estimate $I_{PH\_OUT}$ will also be updated at the frequency f1. The slope integrator 680 may be cleared/reset at the end of an SR switch period $T_{SR\_ON}$, as the phase current estimate $I_{PH\_EST}$ is typically expected to be zero when the SR switch $Q_{SR}$ is not conducting and any residual accumulation at the end of an SR switch period $T_{SR\_ON}$ should not be carried forward to the beginning of the next SR switch period $T_{SR\_ON}$.

The analog conversion circuit 540 includes a digital-to-analog converter (DAC) 642 and an analog-to-digital converter (ADC) 644, both of which provide conversions at a frequency of f2. Before it can be used by the DAC 642, the phase current estimate $I_{PH\_EST}$ must be downsampled from the frequency f1 of the digital estimation circuit 550 to the frequency f2 of the analog conversion circuit 540. This is performed by a downsampler 684 which is shown within the digital estimation circuit 550, but which could also be located elsewhere, including within the analog conversion circuit 540. The downsampled phase current estimate, denoted as $I_{PH\_EST\_F2}$, is converted into an analog signal $I_{PH\_EST\_F2\_ANALOG}$ by the DAC 642. An analog measured (sensed) phase current $I_{PH\_SENSE}$ is input to an analog summation circuit 646, which subtracts the analog phase current estimate signal $I_{PH\_EST\_F2\_ANALOG}$ from the sensed current $I_{PH\_SENSE}$ to yield an analog error signal $I_{ERR\_ANALOG}$. The analog error signal $I_{ERR\_ANALOG}$ is digitized by the ADC 644 to generate a digital error signal error_d, which is provided back to the digital estimation circuit 550. Because the ADC 644 is providing conversions at the frequency f2, the digital error signal error_d is updated at a rate corresponding to the frequency f2.

The digital error signal error_d is provided to a slope adjuster 660, which provides modified versions of this error signal to the slope estimator 670 and to the digital summing circuit 682. An error integrator 664 inputs the digital error signal error_d and integrates (accumulates) it in order to generate an integrated error err_int. The integrated error err_int is then scaled by a gain block 666 and provided to the slope estimator 670, which uses the integrated error $K_{INT}$*err_int to update/improve its slope estimation, as will be explained more fully in the description of FIG. 7. The error integrator 664 will typically be reset by a signal $RST_{ERR\_INT}$ at the beginning of each conducting period $T_{SR\_ON}$ for the SR switch $Q_{SR}$, so as to clear out any noise that has erroneously accumulated during the off period of the SR switch $Q_{SR}$ or any integrated error left over from a prior switching cycle. The error integrator 664 may be reset to zero or to a non-zero initial value such as some portion of the final value left in the integrator at the end of the prior SR conducting period $T_{SR\_ON}$, e.g., it could be set to 25% or 50% of its prior final value. The reset signal $RST_{ERR\_INT}$ typically corresponds to, and may be the same as, the PWM signal "SR" shown in FIG. 2.

In addition to updating the slope estimator 670, the outputs of the slope adjuster 660 are provided to the digital summation circuit 682 in order to provide a more direct error correction. The integrated error err_int is scaled by $K_{INT}$ and added to the slope estimate $m_{EST}$ to improve this estimate. The integration of the error signal error_d serves to filter (smooth) the signal and prevent any large changes due to noise or other systematic anomalies which should not be tracked. However, this smoothing comes at the expense of slower tracking of the estimated phase current $I_{PH\_EST}$ to the actual sensed current $I_{PH\_SENSE}$. Another version of the digital error signal error_d is not integrated, but is merely scaled by $K_P$ within a gain block 662 to yield a proportional error term that can more quickly correct/improve the slope estimate $m_{EST}$. The improved slope estimate output by the digital summation circuit 682 is thus given by $m_{EST\_IMP}=m_{EST}+K_P$*error_d+$K_{INT}$*err_int. The gain terms $K_P$ and $K_{INT}$ determine the speed and noise suppression of the tracking loop. A relatively high value of $K_P$ leads to faster tracking, but introduces the possibility of undesirably tracking noise. Conversely, a relatively high value for $K_{INT}$ should suppress noise or other transients, but at the expense of slower tracking of the phase current $I_{PH\_SENSE}$. Note that the slope estimate $m_{EST}$ provided by the slope estimator 670 is updated at the (fast) f1 frequency, whereas the other terms contributing to $m_{EST\_IMP}$ are only updated at the (slow) f2 frequency.

Figure 7:
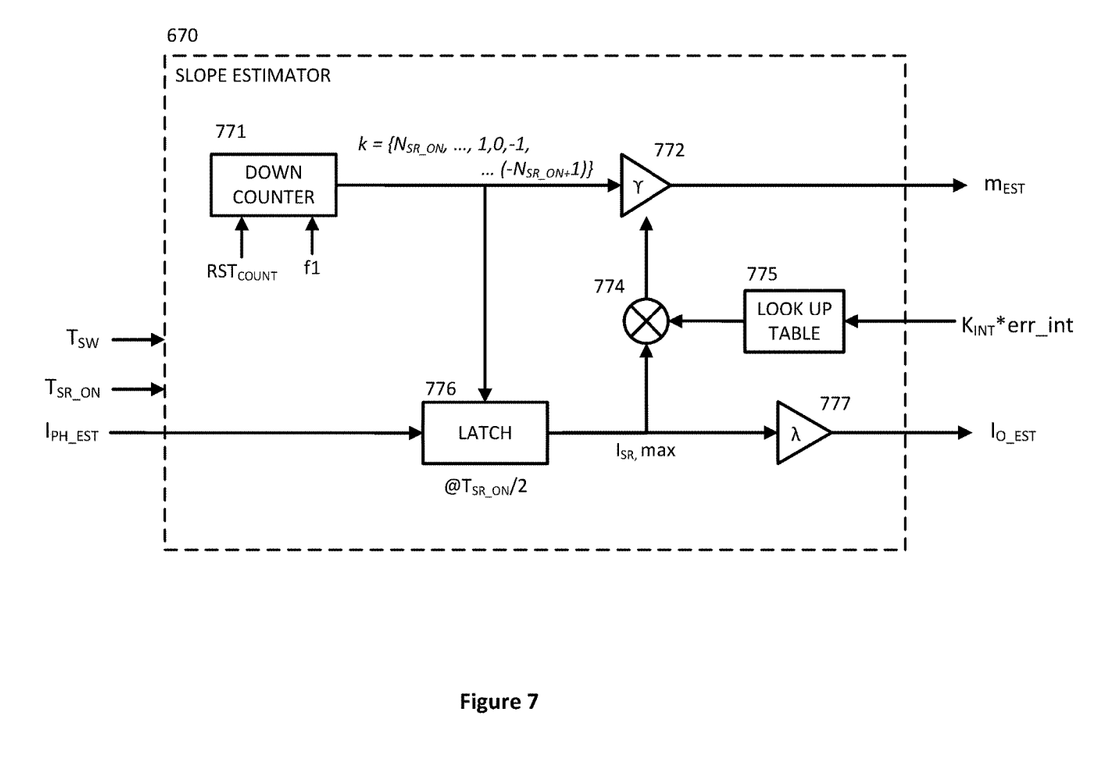
FIG. 7 illustrates an embodiment of a slope estimator, such as that shown in the phase current estimator of FIG. 6.

FIG. 7 illustrates the slope estimator 670 in further detail. The slope estimator 670 is based upon a model of the current $I_{SR}$ through the SR switch $Q_{SR}$ as given by equation (12), which is replicated below (with the notation $T_{SR\_ON}$ used rather than $T_{OFF}$) along with its time derivative:

$$I_{SR}=n\alpha(T_{SR\_ON}-t)t, \text{ for } 0<t<T_{SR\_ON} \tag{17}$$

$$\frac{dI_{SR}}{dt} = n\alpha(T_{SR\_ON}-2t), \text{ for } 0<t<T_{SR\_ON} \tag{18}$$

The slope of the SR switch current $I_{SR}$ may be determined from its time derivative and, thus, equation (18) may be used to estimate the current slope $m_{EST}$ during the on period $T_{SR\_ON}$ of the SR switch $Q_{SR}$. For simplification in the low-level implementation, the term $(T_{SR\_ON}-2t)$ will be converted into an alternate form. For the time range given by $0<t<T_{SR\_ON}$, the term $t_{shift}=(T_{SR\_ON}-2t)$ varies from $+T_{SR\_ON}$ to $-T_{SR\_ON}$. Substituting $t_{shift}$ for $(T_{SR\_ON}-2t)$ in equation (18) thus leads to:

$$\frac{dI_{SR}}{dt} = n\alpha(t_{shift}), \text{ for } +T_{SR\_ON}<t_{shift}<-T_{SR\_ON} \tag{19}$$

The slope estimator 670 only produces slope estimates $m_{EST}$ at discrete points in time given by $$k = \left\| \frac{t_{shift}}{T_{CLK}} \right\|,$$

where $T_{CLK}$ is related to the sample frequency f1 as $T_{CLK}=1/f1$. This leads to the digital (discrete) form of equation (19) given by:

$$m_{EST}(k)=n\alpha(k*T_{CLK}), \text{ for } k=+N_{SR\_ON} \text{ to } -N_{SR\_ON}, \tag{20}$$

where $N_{SR\_ON}=T_{SR\_ON}/T_{CLK}$, and k is an integer. Substituting the approximation for α that was derived in equation (16) yields:

$$m_{EST}(k) = n\left(\frac{4I_{SR},\max}{nT_{SR\_ON}^2}\right)(k*T_{CLK}) = k\left(\frac{4T_{CLK}}{T_{SR\_ON}^2}\right)I_{SR},\max = k\gamma, \tag{21}$$

where $$\gamma = \left(\frac{4T_{CLK}}{T_{SR\_ON}^2}\right)I_{SR},\max, \tag{22}$$

and k varies from $+N_{SR\_ON}$ to $-N_{SR\_ON}$.

The slope estimator 670 includes a down counter 771 which generates the count k during the conducting period $T_{SR\_ON}$ of the SR switch $Q_{SR}$. The down counter 771 is reset to an initial value at the beginning of each SR conducting period $T_{SR\_ON}$, as may be indicated by the rising edge of the PWM signal "SR" that is generated by the control circuit 110 shown in FIG. 2 and as may be provided by a reset signal $RST_{count}$. The initial value is set to $N_{SR\_ON}=\|T_{SR\_ON}/T_{CLK}\|$, where $T_{SR\_ON}$ corresponds to the conducting period $T_{SR\_ON}$ of the SR switch $Q_{SR}$ for the current switch cycle, and may be provided by the control circuit 110. The count k is decremented at a frequency given by f1, i.e., k is reduced by one after each clock period $T_{CLK}$.

The count k generated by the down converter 771 is provided to a gain block 772 wherein the count k is multiplied by a slope gain γ to produce the slope estimate $m_{EST}$. As shown in equation (22) above, the slope gain γ is initialized to a value based upon $T_{SR\_ON}$ and $I_{SR}$,max, each of which are, at least typically, updated once per switch cycle. As will be explained later, the slope gain γ may be updated within a switch cycle to improve the slope estimate $m_{EST}$.

Note that several alternatives to the above-described circuit based upon the down counter 771 are possible, and may be preferred in some embodiments. For example, a standard (up) counter may be used, in which case equation (18) may be used more directly. The initial value for such an up counter would be different (e.g., zero), a subtraction such as in equation (18) would need to be performed, and a different gain term may need to be derived.

The maximum current $I_{SR}$,max through the SR switch $Q_{SR}$ occurs midway through the conducting period, i.e., at $T_{SR\_ON}/2$. The maximum current $I_{SR}$,max is stored by a latch 776, which updates this current $I_{SR}$,max by capturing the phase current estimate $I_{PH\_EST}$ at $T_{SR\_ON}/2$. The count value k, which is generated by the down counter 771, is used for determining when to latch the current estimate $I_{PH\_EST}$. For the count sequence shown in FIG. 7 and described above, the phase current estimate $I_{PH\_EST}$ would be latched at k=0 to capture the maximum current $I_{SR}$,max.

In addition to its usage in determining the slope gain γ, as described above, the maximum current $I_{SR}$,max is also used to generate an estimate $I_{O\_EST}$ of the average output current, i.e., the current $I_O$ shown in equation (6). This average output current estimate $I_{O\_EST}$ may be used by the control circuit 110 for purposes that only require infrequent estimates of the phase current $I_{SR}$, and for which the half-sinusoidally shaped SR current estimate $I_{PH\_EST}$ is inappropriate. As with the maximum current $I_{SR}$,max, the average output current estimate $I_{O\_EST}$ is only updated once per switching cycle. The average output current estimate $I_{O\_EST}$ is generated by the gain block 777 by multiplying the latched maximum current $I_{SR}$,max, by a gain term λ. The gain term λ may be derived from equation (15) as follows:

$$I_O = \left(\frac{I_{SR},\max T_{SR\_ON}}{1.5\, T_{SW}}\right) = \lambda I_{SR},\max, \quad (23)$$

$$\lambda = \left(\frac{T_{SR\_ON}}{1.5\, T_{SW}}\right). \quad (24)$$

As described previously, the initial slope gain γ is based upon $T_{SR\_ON}$ and $I_{SR}$,max, each of which are only updated once per switching cycle. In order to better track the phase current within a conducting period $T_{SR\_ON}$ of the SR switch $Q_{SR}$, the initial slope gain γ is modified by taking into account an error signal that is input to the slope estimator 670. Preferably, the scaled and integrated error signal $K_{INT}$*(err_int) generated by the slope adjuster 660 is input to a loop-up table 775, which generates a correction scaling for the slope gain γ. This correction scaling is then provided to a multiplier 774, which feeds the slope gain γ to the slope gain block 772.

For the case where the slope estimate $m_{EST}$ is perfect and the phase current estimate $I_{PH\_EST}$ is perfectly tracking the measured phase current $I_{PH\_SENSE}$, there is no error and the scaled and integrated error signal $K_{INT}$*(err_int) provided to the look up table 775 would be zero. The look up table 775 would provide a value of 1.0 to the multiplier 774, such that the multiplier output would provide a slope gain γ equivalent to the initial value of the slope gain γ as given by equation (22). If the scaled and integrated error signal $K_{INT}$*(err_int) is sufficiently positive, indicating that the measured phase current $I_{PH\_SENSE}$ is greater than the phase current estimate $I_{PH\_EST}$, then the estimated slope $m_{EST}$ is too small. For this case, the look up table 775 would provide a correction scaling greater than 1.0 that would be used by the multiplier 774 to increase the slope gain γ. This, in turn, would lead to an increased estimated slope $m_{EST}$, an increased phase current estimate $I_{PH\_EST}$, and reduced error signals error_d, err_int. Conversely, if the scaled and integrated error signal $K_{INT}$*(err_int) is sufficiently negative, this indicates that the measured phase current $I_{PH\_SENSE}$ is smaller than the phase current estimate $I_{PH\_EST}$. For this case, the look up table 775 would provide a scaling less than 1.0 that would subsequently reduce the estimated slope $m_{EST}$ and lead to a more accurate phase current estimate $I_{PH\_EST}$.

The correction provided by the look up table 775 could be performed in alternate ways, e.g., the correction could be provided by a function that depends upon an integrated error or some other variation of the error. The look up table 775 could use hard-coded values that are put in place when the slope estimator 670 is produced, could include values that are adaptively updated during normal operation, or could be loaded with values produced during a calibration phase of the slope estimator 670.

As described above, the slope estimator 670 uses the switch cycle period $T_{SW}$ and the SR conducting period $T_{SR\_ON}$ in its generation of the slope estimate $m_{EST}$, e.g., to determine the count initialization $N_{SR\_ON}$, the slope gain γ, and the gain term λ. These periods $T_{SW}$, $T_{SR\_ON}$ may be provided directly from some other portion of the control circuit 110, e.g., the frequency and duty cycle generator 112, or they may be determined by the phase current estimator 218 based upon other input signals (not shown in FIG. 6 or 7 for ease of illustration). For example, one or more of the PWM signals HS, SR shown in FIG. 2 could be used by the phase current estimator 218 to determine the periods $T_{SW}$, $T_{SR\_ON}$. Whether the periods $T_{SW}$, $T_{SR\_ON}$ are provided to or determined by the phase current estimator 218, there is typically a lag of one switch cycle in updating these periods $T_{SW}$, $T_{SR\_ON}$. In other words, the values used by the phase current estimator 218 for the periods $T_{SW}$, $T_{SR\_ON}$ for a given switching cycle are typically based upon the periods $T_{SW}$, $T_{SR\_ON}$ generated by the PWM generator 116 in the previous switching cycle.

Figure 8:
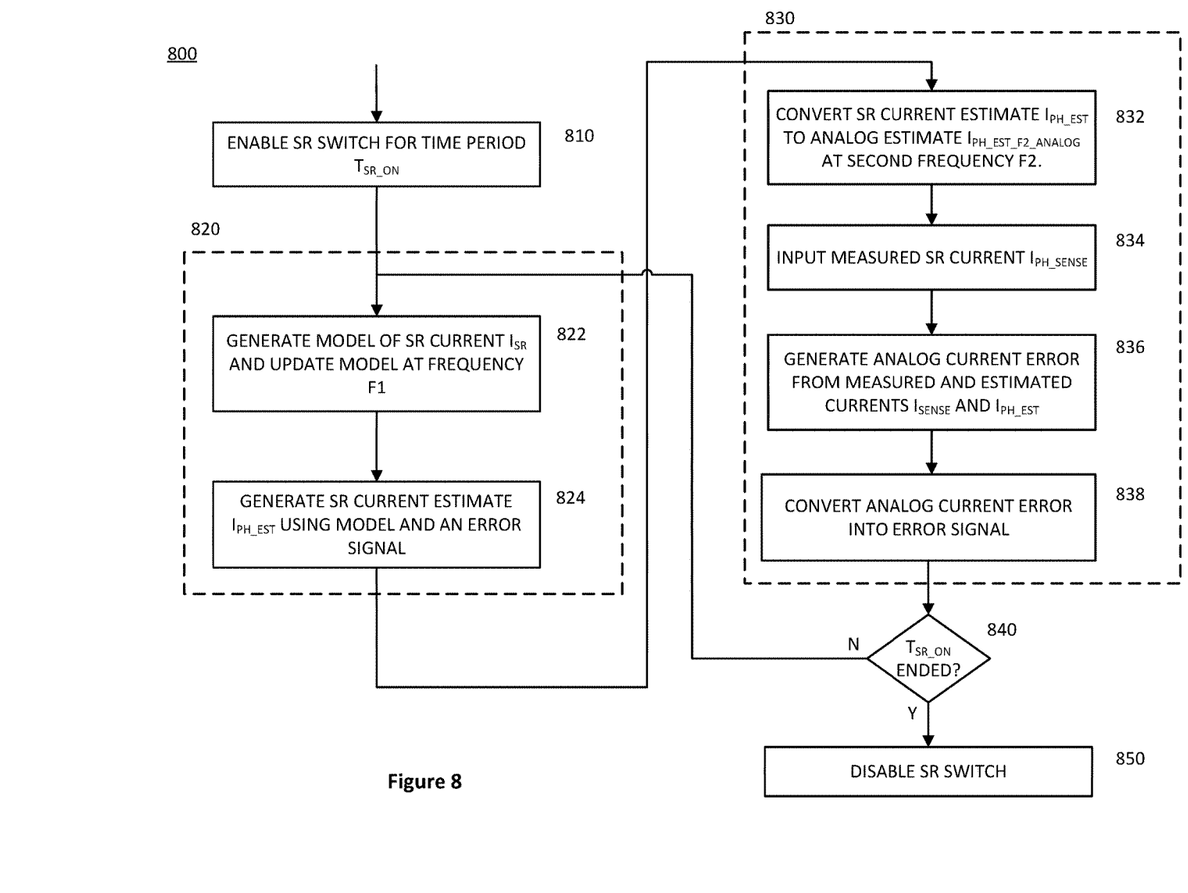
FIG. 8 illustrates a flow diagram corresponding to a method for estimating current flowing through an SR switch within a semi-resonant voltage converter, such as that shown in FIG. 2.

FIG. 8 illustrates an embodiment of a method 800 for estimating phase current in a resonant voltage converter such as those shown in FIGS. 1 and 2. The method 800 of FIG. 8 may be implemented within the control circuit 110 of the voltage converter 100 or 200.

The method begins with the enabling 810 of an SR switch within a voltage converter, such that the SR switch conducts current. The SR switch is left enabled for a time period $T_{SR\_ON}$. A counter and clock may be used to count down the time period $T_{SR\_ON}$. A model of current $I_{SR}$ through the SR switch is generated and updated 822. This updating is performed at a fast frequency of f1. Next, an SR current estimate $I_{PH\_EST}$ is generated 824 using the model and an error signal. The estimated SR current estimate $I_{PH\_EST}$ is converted 832 into an analog estimate $I_{PH\_EST\_F2\_ANALOG}$ at a slow frequency f2. The measured SR switch current $I_{SENSE}$ is input 834. The analog estimate $I_{PH\_EST\_F2\_ANALOG}$ is combined with the measured SR switch current $I_{SENSE}$, e.g., by subtracting, to generate 836 an analog current error. This analog current error is then converted 838 (digitized) to form the error signal that was used in the generation 824 of the SR current estimate $I_{PH\_EST}$. Once the above sequence is complete, a check 840 is made to determine if the SR conducting period $T_{SR\_ON}$ has ended. This may be done, for example, by comparing a counter that was reset when the SR switch was enabled 810 against a threshold corresponding to the SR conducting period $T_{SR\_ON}$. If the SR conducting period $T_{SR\_ON}$ is not over, then operation continues with the generation and update 822 of the SR current model. If the SR conducting period $T_{SR\_ON}$ is completed, then the loop is exited and the SR switch is be disabled 850.

Note that the steps within the dotted box 820 are performed at the (fast) frequency f1, whereas the steps within dotted box 830 are performed at the slower frequency f2. Accordingly, the steps 820 may be performed multiple times, and the current estimate $I_{PH\_EST}$ updated multiple times, for each iteration of the steps in box 830.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage converter that uses a variable switching frequency, the voltage converter comprising:
    a first phase that comprises a synchronous rectification (SR) switch through which an SR current having a half-cycle sinusoidal-like shape is conducted when the SR switch is active;
    a PWM generator operable to control cycle-by-cycle switching of the SR switch by providing a pulse width modulation (PWM) control signal to the SR switch, the frequency of the PWM control signal being based upon a first estimate of the SR current; and
    a current estimator comprising:
        a digital estimation circuit configured to generate the first estimate of the SR current using a model of current through the SR switch and an error signal, and configured to update the first estimate of the SR current at a first frequency; and
        an analog conversion circuit configured to input a measured current corresponding to the SR current, to provide conversions at a second frequency, and to generate the error signal.

2. The voltage converter of claim 1, wherein the first phase further comprises:
    a power stage including a high-side switch and a low-side switch coupled to the high-side switch at a switching node of the power stage; and
    a passive circuit including a transformer/tapped-inductor, the passive circuit coupling the switching node to an output node of the voltage converter, and that is coupled to ground through the SR switch when the SR switch is conducting,
    wherein the PWM generator is further operable to control cycle-by-cycle switching of the high-side switch and the low-side switch by providing PWM control signals to each of the high-side and low-side switches.

3. The voltage converter of claim 1, further comprising additional phases, each of which comprises an additional SR switch through which an additional SR current having a half-cycle sinusoidal-like shape is conducted when the additional SR switch is active.

4. The voltage converter of claim 1, wherein the first frequency is greater than the second frequency.

5. The voltage converter of claim 1, wherein the digital estimation circuit is configured to model the SR current based upon a polynomial of order two or higher.

6. The voltage converter of claim 5, wherein the polynomial is a second-order polynomial given by:

$$I_{SR\_EST} = n\alpha(T_{SR\_ON} - t)t$$

wherein n is related to the turns ratio of a transformer/tapped-inductor to which the SR switch is coupled,
$T_{SR\_ON}$ is a period of time within a cycle of the voltage converter during which the SR switch is conducting,
t is a time from the beginning of the period during which the SR switch is conducting, and
α is based upon a switch period $T_{SW}$ of the cycle of the voltage converter, and the period of time $T_{SR\_ON}$ that the SR switch is conducting.

7. The voltage converter of claim 1, wherein the analog conversion circuit comprises:
    a digital-to-analog converter configured to input the first estimate of the SR current and to convert this first estimate into an analog SR current estimate at a rate corresponding to the second frequency;
    a current summation circuit configured to generate an analog error by summing the analog SR current estimate and the measured current; and
    an analog-to-digital converter configured to convert the analog error into the error signal at a rate corresponding to the second frequency.

8. The voltage converter of claim 1, wherein the digital estimation circuit further comprises:
    a slope estimator configured to generate a first estimate of the slope of the SR current, the estimated slope being updated at the first frequency.

9. The voltage converter of claim 1, wherein the digital estimation circuit further comprises:
    an error integrator configured to integrate and scale the error signal to produce an integrated error, wherein the integrated error is updated at a rate corresponding to the second frequency.

10. The voltage converter of claim 9, wherein the digital estimation circuit further comprises:
    a digital summation circuit configured to generate an improved slope estimate by summing the integrated error, the error signal or a scaled version of the error signal, and a first estimate of the slope of the SR current; and
    a slope integrator configured to integrate the improved slope estimate.

11. The voltage converter of claim 9, further comprising:
    a slope estimator configured to generate a first estimate of the slope of the SR current based upon the integrated error and a look-up table.

12. The voltage converter of claim 9, wherein the digital estimation circuit is further configured to generate a second SR current estimate based upon the first SR current estimate, by latching the first SR current estimate at a time given by $t=T_{SR\_ON}/2$, wherein the time t starts at zero when the SR switch is turned on during a switching cycle, and $T_{SR\_ON}$ is a period of time during which the SR switch is conducting before it is turned off during the switching cycle, the second SR current estimate being updated once in each switching cycle.

13. A method for current estimation in a variable-frequency voltage converter, the variable-frequency voltage converter including a synchronous rectification (SR) switch through which an SR current having a half-cycle sinusoidal-like shape is conducted when the SR switch is active, the method comprising, for each switching cycle of the variable-frequency voltage converter:
 enabling the SR switch such that it conducts the SR current for an SR conducting period, the SR conducting period being a portion of a switching period for a current switching cycle;
 generating a modelled SR current, the modelled SR current being based upon a model of the SR current during the SR conducting period and being updated at a first frequency;
 generating a first SR current estimate using the modelled SR current and an error signal;
 converting the first SR current estimate to an analog SR current estimate such that the analog SR current estimate is updated at a second frequency;
 inputting a measured SR current and generating an analog SR current error by generating a difference between the measured SR current and the analog SR current estimate; and
 converting the analog SR current error into the error signal, such that the error signal is updated at the second frequency.

14. The method of claim 13, wherein the first frequency is greater than the second frequency.

15. The method of claim 13, wherein the model of the SR current is based upon a polynomial of order two or higher.

16. The method of claim 13, wherein the polynomial is a second-order polynomial given by:

$$I_{SR\_EST}=n\alpha(T_{SR\_ON}-t)t$$

wherein n is related to the turns ratio of a transformer/tapped-inductor to which the SR switch is coupled,
$T_{SR\_ON}$ is the SR conducting period,
t is a time from the beginning of the SR conducting period for the current switching cycle, and
$\alpha$ is based upon the switching period $T_{SW}$ for the current switching cycle and the SR conducting period $T_{SR\_ON}$.

17. The method of claim 13, further comprising:
 generating an estimate of a slope of the SR current, the slope estimate being updated at the first frequency.

18. The method of claim 13, further comprising:
 generating an integrated error by integrating and scaling the error signal, such that the integrated error is updated at a rate corresponding to the second frequency, and
 wherein the generation of the first SR current estimate is further based upon the integrated error.

19. The method of claim 18, further comprising:
 generating an estimate of a slope of the SR current;
 summing the integrated error, the error signal or a scaled version of the error signal, and the estimate of the slope of the SR current to generate an improved slope estimate;
 integrating the improved slope estimate to generate an integrated slope; and
 updating the estimate of the slope of the SR current based upon the integrated slope.

20. The method of claim 18, further comprising:
 generating an estimate of a slope of the SR current based upon the integrated error and a look-up table.

21. The method of claim 13, further comprising:
 generating a second SR current estimate based upon the first SR current estimate, by latching the first SR current estimate at a time given by $t=T_{SR\_ON}/2$, $T_{SR\_ON}$ being the SR conducting period for a given switching cycle, the time t starting at zero at the beginning of the SR conducting period, the second SR current estimate being updated once in each switching cycle.

* * * * *

UNITED STATES PATENT AND TRADEMARK OFFICE
CERTIFICATE OF CORRECTION

PATENT NO. : 9,882,476 B2
APPLICATION NO. : 15/168439
DATED : January 30, 2018
INVENTOR(S) : A. Babazadeh

Page 1 of 1

It is certified that error appears in the above-identified patent and that said Letters Patent is hereby corrected as shown below:

On the Title Page

Item [73], change "Tehnologies" to -- Technologies --.

Signed and Sealed this
Twenty-fourth Day of July, 2018

Andrei Iancu
*Director of the United States Patent and Trademark Office*